April 3, 1928.  
E. H. J. C. GILLETT  
1,665,165  
FRICTION OR ADHESION GEARING  
Filed April 10, 1926  
2 Sheets-Sheet 1

Inventor.  
E.H.J.C.Gillett  
Attys.

April 3, 1928.  1,665,165
E. H. J. C. GILLETT
FRICTION OR ADHESION GEARING
Filed April 10, 1926    2 Sheets-Sheet 2

Inventor,
E.H.J.C Gillett
by Jukus Luchausky Co
Attys.

Patented Apr. 3, 1928.

1,665,165

UNITED STATES PATENT OFFICE.

EDWARD HENRY JAMES CECIL GILLETT, OF HAMPSTEAD, LONDON, ENGLAND.

FRICTION OR ADHESION GEARING.

Application filed April 10, 1926, Serial No. 101,139, and in Great Britain September 10, 1925.

This invention relates to epicyclic frictional power-transmission gearing of the kind comprising an inner and an outer race ring with a plurality of interposed planetary transmitting rollers connected to one of the transmitting shafts, one of said race rings being radially resilient and provided with pressure devices acting to vary the contact pressure of the transmitting parts proportionately to the torque to be transmitted.

A prior proposal has been made to construct a gear of this type in which the pressure devices consist of a number of single rollers symmetrically disposed around the gear between an outer radially rigid ring and inner radially resilient ring furnished with a number of plane surfaces to impart a wedging action to the said rollers.

An object of the present invention is to obtain a more uniform loading of the transmitting parts in a gear of the type referred to and to secure an initial binding pressure sufficient to ensure the operation of the gear and a relative movement between the parts such as to bring into action the pressure devices which serve to vary the contact pressure proportionately to the torque to be transmitted.

To this end, epicyclic friction gearing of the type set forth embodies according to the present invention an axially displaceable element loaded in any convenient manner and provided with a coned or tapered portion engaging the resilient race ring in suchwise as to exert a radial pressure thereon serving thereby to maintain the contact pressure of the transmitting parts.

Where the inner race ring is resilient, this element may conveniently take the form of a spring-loaded sleeve slidably mounted on one of the transmitting shafts and provided with a coned face engaging a correspondingly coned surface on one inner edge of the resilient ring, the axial thrust being taken by similarly coned surfaces on the other inner edge of said ring.

Further, according to the present invention, instead of a single roller disposed so as to become wedged, upon rotation of the parts, between angular surfaces and the resilient ring, pairs of rollers are provided thrust apart by springs. This arrangement results in the immediate and simultaneous engagement of one roller of each pair between the surfaces aforesaid as soon as the parts are rotated, thereby ensuring a perfectly uniform distribution of pressure throughout the gear and eliminating the possibility of one or more wedging rollers engaging before the others and thereby tending to thrust the parts off centre.

In a preferred form of the invention the high speed shaft or an element connected thereto is furnished with a series of plane or suitable curved surfaces symmetrically disposed around said element, with the pairs of pressure rollers arranged between said surfaces and a radially resilient ring, and the planetary transmitting rollers running between the outer surface of this ring and the inner surface of a fixed ring, the latter rollers being carried in a cage connected to the low speed shaft.

The planetary transmitting rollers may be mounted simply in bushes, or in ball or other bearings in the cage, or if it is desired to provide an automatic adjustment for wear said rollers may be journalled in blocks slidable radially in guides in the cage.

The accompanying drawings illustrate by way of example one constructional form of the present invention.

Referring to these drawings:—

The casing A made in two parts bolted together carries a fixed race B between which and an inner resilient race C runs a set of planetary rollers D whose ends $D^1$ are journalled in bushes E borne by a cage F bolted to the low speed shaft G, the cage F being located axially by bearings $F^1$ and $F^2$.

Figure 1:
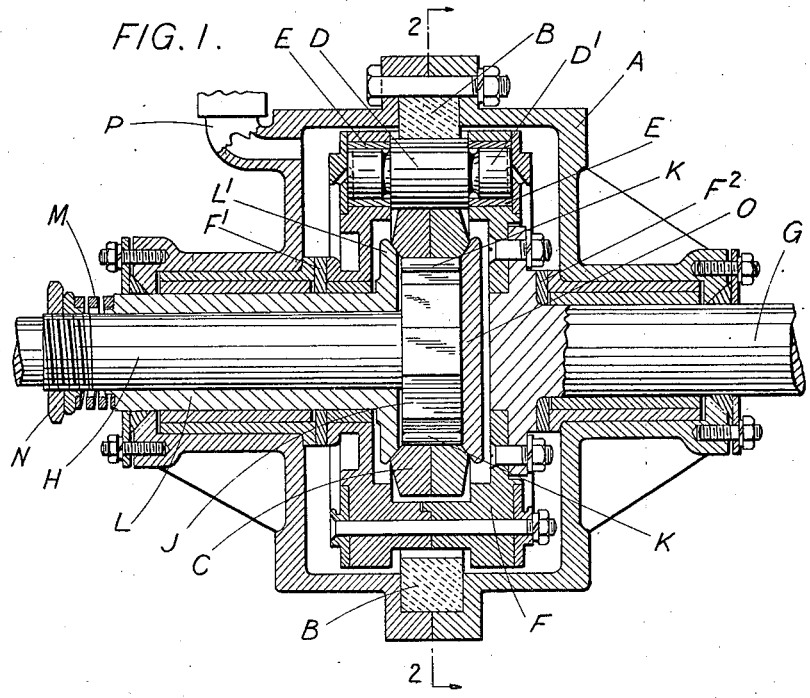
Fig. 1 is a longitudinal section of the gear taken on the line 1—1 Fig. 2.
Figure 2:
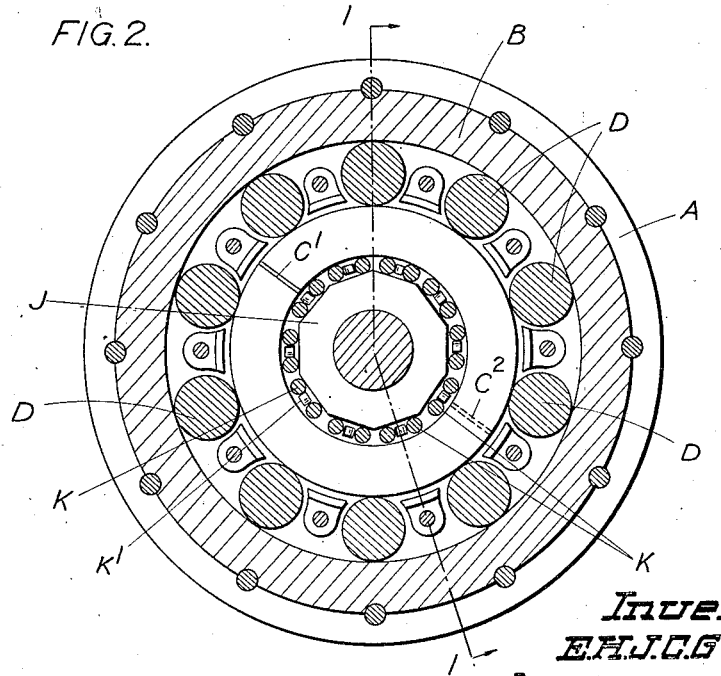
Fig. 2 shows a transverse section taken on the line 2—2 Fig. 1.

The high-speed shaft H carries at its inner end an enlargement J furnished with a symmetrical series of flats or plane surfaces formed by the chords of its circumference. Between each flat and the resilient race C, which latter is formed in two parts each split radially at $C^1$ and $C^2$ (Fig. 2), is located a pair of rollers K thrust apart by a spring $K^1$ so that upon rotation of the transmitting parts in one direction one roller K of each pair will become wedged between the flats and the race C, rotation in the contrary sense serving similarly to wedge the other rollers K of each pair, the wedging effect and consequently the radial pressure exerted on the race increasing automatically with increase of torque.

Mounted to slide axially on the shaft H is a sleeve L furnished with a face plate L¹ coned or tapered to engage one tapered inner edge of the race C. A spring M is mounted between an adjusting head N screwed on the shaft H and the outer end of the sleeve J to apply on axial thrust to the latter acting to exert a radial pressure on the race C through the medium of their tapered engaging surfaces. The axial thrust on the race C is taken by a correspondingly tapered element O rigidly mounted on the part J and engaging the opposite tapered edge of the race C. A clearance is provided between the face plate L¹ and the part J to allow an automatic adjustment for wear.

In this manner a uniform initial pressure is applied to the race C acting to prevent any unequal wedging action of the rollers K.

A filling hole P for lubricant is provided in the casing.

Figure 3:
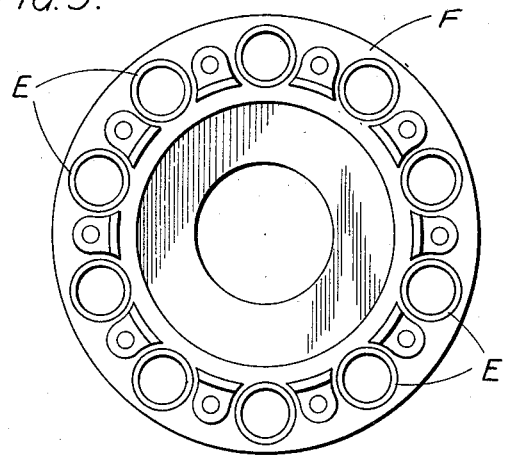
Fig. 3 is a sectional view of the cage showing the planetary rollers journalled in bushes in the cage.

In the arrangement illustrated in Fig. 3 the ends D¹ of the rollers D are simply journalled in bushes E in the cage F.

Figure 4:
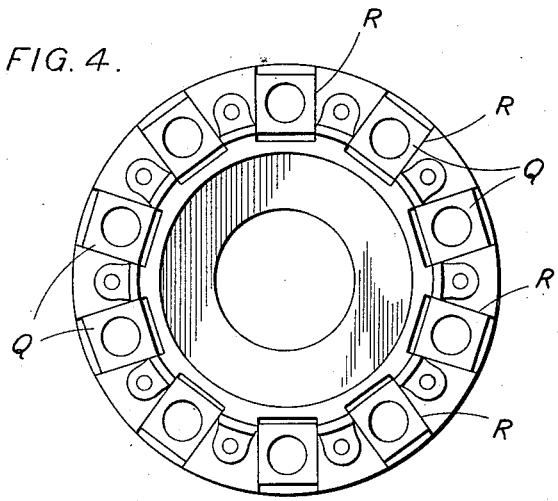
Fig. 4 is a similar view showing the rollers journalled in blocks slidable radially in the cage.

In Fig. 4, said ends D¹ are shown mounted in blocks Q slidable in radial guides R in the cage to allow automatic adjustment for wear.

What I claim is:—

1. Epicyclic frictional transmission gearing comprising a fixed and a movable race-ring, one of which is radially resilient, a plurality of planetary rollers running between said rings and an axially displaceable spring-loaded member provided with a tapered portion engaging the resilient ring in suchwise as to exert a radial pressure thereon, a plurality of wedging surfaces associated with the resilient ring and a set of devices such as rollers arranged between the wedging surfaces and the resilient ring and acting to vary the radial pressure applied to the latter proportionally to the torque to be transmitted.

2. Epicyclic frictional transmission gearing comprising an inner and an outer race-ring one of which is radially resilient, a plurality of planetary transmitting rollers running between said rings, an axially displaceable spring-loaded member tapered to engage the resilient ring so as to exert a radial pressure thereon, a plurality of rollers symmetrically disposed in pairs around the gear between the resilient ring and a series of wedging surfaces, the rollers of each pair being thrust apart by springs so that upon rotation of the parts in either direction one roller of each pair becomes wedged simultaneously and acts to vary the contact pressure of the transmitting parts proportionally to the torque to be transmitted.

3. Epicyclic frictional transmission gearing as claimed in claim 2 and in which the inner race-ring is radially resilient and the axially displaceable member is constituted by a spring-loaded sleeve slidable on one of the transmitting shafts and provided with a coned face engaging one correspondingly coned inner edge of the resilient ring, with a similarly coned axially fixed surface engaging the other edge of the resilient ring to take the axial thrust thereon.

4. Epicyclic frictional transmission gearing comprising an inner and an outer race-ring, the inner one being radially resilient, a plurality of planetary transmitting rollers running between said rings, a series of wedging surfaces symmetrically arranged around the periphery of a boss on the inner end of one of the transmitting shafts, a spring-loaded sleeve on the said shaft provided with a tapered surface engaging a similarly tapered inner edge of the resilient ring, an axially rigid tapered member to take the thrust on the opposite inner edge of said ring, a plurality of rollers symmetrically disposed in pairs around the gear between the resilient ring and the aforesaid surfaces on the boss of the shaft, the rollers of each pair being thrust apart by springs so that upon rotation of the parts in either direction one roller of each pair becomes wedged simultaneously and acts to vary the contact pressure of the transmitting parts proportionally to the torque to be transmitted.

5. Epicyclic frictional transmission gearing comprising an inner and an outer race-ring, the inner one being radially resilient, a plurality of planetary transmitting rollers running between said rings and mounted in blocks slidable in radial guides in a cage, a series of wedging surfaces symmetrically arranged around the periphery of a boss on the inner end of one of the transmitting shafts, a spring-loaded sleeve on the said shaft provided with a tapered surface engaging a similarly tapered inner edge of the resilient ring, an axially rigid tapered member to take the thrust on the opposite inner edge of said ring, a plurality of rollers symmetrically disposed in pairs, around the gear between the resilient ring and the aforesaid surfaces on the boss of the shaft, the rollers of each pair being thrust apart by springs so that upon rotation of the parts in either direction one roller of each pair becomes wedged simultaneously and acts to vary the contact pressure of the transmitting parts proportionally to the torque to be transmitted.

EDWARD HENRY JAMES CECIL GILLETT.